United States Patent Office.

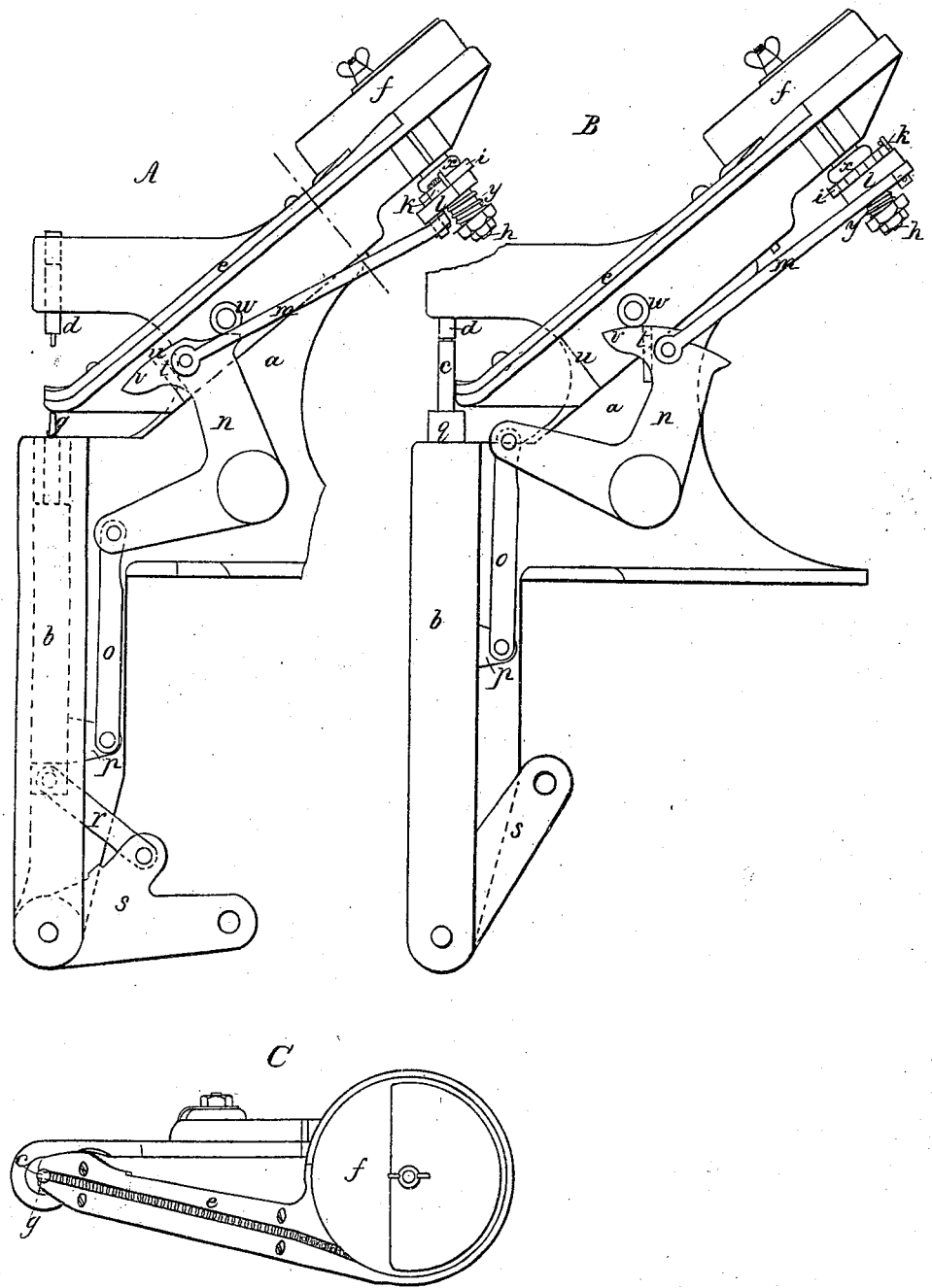

JOSEPH F. SARGENT, OF MELROSE, ASSIGNOR TO ELMER TOWNSEND, OF BOSTON, MASSACHUSETTS.

Letters Patent No. 93,353, dated August 3, 1869.

---

IMPROVEMENT IN EYELETING-MACHINES.

---

The Schedule referred to in these Letters Patent and making part of the same.

---

*To all whom it may concern:*

Be it known that I, JOSEPH F. SARGENT, of Melrose, in the county of Middlesex, and State of Massachusetts, have invented an Improved Eyeleting-Machine; and I do hereby declare that the following, taken in connection with the drawings which accompany and form part of this specification, is a description of my invention, sufficient to enable those skilled in the art to practise it.

The general construction and operation of that class of eyeleting-machines, in each of which eyelets, thrown loosely into a box or reservoir, are automatically transferred therefrom into a roadway or chute leading to setting-tools, so that at each reciprocation of one of such tools, an eyelet will be taken from the chute and clinched by the setting-tools, are well-understood.

In the United States patent, No. 43,816, granted to Elmer Townsend, assignee, (to whom the present invention is also assigned,) there is shown a hopper, combined with a sliding chute, (of which it forms a part,) and with a vertically reciprocating eyelet-pin and setting-tool.

Within this hopper is a vibrating brush, or set of brushes, which urge the eyelets against the passages leading from the hopper into the chute, the action of the brushes, and the reciprocating motion of the hopper, causing the eyelets to pass into the chute, down which they slide toward the setting-tools.

The action of the brushes is not, however, very reliable in keeping the chute charged with eyelets, and my present invention has particular reference to such construction and arrangement of the parts as shall cause the chute to be kept fully supplied, for which purpose I combine with the reciprocating chute a hopper, or eyelet-containing reservoir, which not only reciprocates with the chute, but which has, at each reciprocating movement of the chute and hopper, a rotative movement, the effect of which combined movements is such as to throw the eyelets from the hopper into the chute, in such manner as to insure the presence of eyelets at all times in the chute, and generally in force sufficient to keep the chute constantly filled.

It is in this construction that my invention consists; that is to say, in combining with a reciprocating eyelet-pin and setting-tool, and with a reciprocating eyelet-chute, an eyelet-containing hopper or reservoir, which not only reciprocates with the chute, but which also has an intermittent rotative movement.

The drawings represent a machine embodying my improvements.

A and B show the machine in side elevation.

C is a plan of the machine, the part of the mechanism above the red line in A being represented as distorted or broken, or thrown down to a horizontal plane.

*a* denotes the frame-work, at the front of which is a post, *b*, containing the vertically reciprocating eyelet-set *c*, over which is the stationary set *d*, against which the eyelet is clinched by the set *c*.

*e* denotes the chute, down through which the eyelets slide, from the eyelet-containing box or hopper *f*, to the eyelet-pin *g* of the set *c*, the hopper being provided with passages which connect with the chute, and which let the eyelets from the hopper into the chute when, and only when, such eyelets are in upright position, and the chute having a reciprocating motion in the plane of its length, so as to bring each eyelet, at its lower end, in succession, into vertical line with the reciprocating set, and to move back the end of the chute from the line of movement of the set *c*, after the eyelet-pin has taken the eyelet upon its point.

The eyelet-box or hopper is placed at the upper end of the chute-plate, but instead of being stationary, relatively to such plate, it is fixed upon a pin, *h*, and rotates with such pin, which passes down through the chute-plate, and turns loosely in its bearings.

Upon this pin is fixed a ratchet-wheel, *i*, with which engages a spring-pawl, *k*, said pawl being jointed to a rocker-arm, *l*, turning loosely on the shaft, this arm being jointed, by a link, *m*, to a rocker-lever, *n*, pivoted to the standard or frame *a*.

This lever (which also directly imparts the reciprocating movement to the chute and hopper) is connected, by a link, *o*, jointed to an arm, *p*, projecting from the piston *q*, to the top of which the movable set *c* is fixed.

The piston *q* is jointed to one arm, *r*, of a togglelever, the other arm, *s*, of which is jointed to the standard, and is operated by a suitable treadle.

One arm of the rocker-lever *n* carries a projection, *t*, which, when the piston *q* descends, strikes a shoulder, *u*, on the chute-plate, and slides the chute down, to bring the end eyelet into position over the eyelet-pin *g*, and when the piston rises, a cam projection, *v*, on such lever-arm, strikes a friction-roll, *w*, or a pin projecting from the chute-plate, and throws the chute back, so as to carry its end out of the path of the eyelet-pin *g*; and as, at each reciprocation of the eyelet-set, the eyelet-box or hopper thus has imparted to it, not only the reciprocating movement of the chute, but a rotative movement, the eyelets are kept in such agitation as to impel them constantly against the passages into the chute, by sliding through which they keep the chute charged, the movements of the hopper being sufficient for this purpose, without any assistant brushes, or other mechanism, to drive them into contact with or through the openings into the chute.

In eyeleting-machines employing a hopper, having an intermittent rotative movement, it is desirable that the hopper may have provision for rotative movement in each direction, or a positive movement away from the chute, and a friction movement toward it. For this purpose, I so arrange the ratchet and pawl, that while the ratchet is driven forward by the pawl, it may slip back with it by friction.

In the drawings, a nut or collar, $x$, surrounds the rotating pin upon which the hopper is mounted, and the ratchet and pawl-lever are pressed up against this nut or collar by a spring, $y$.

When the pawl is pushed upward, it moves the ratchet with it, by its engagement with the ratchet-teeth, and when the pawl moves back, the pressure of the spring causes the ratchet (and thereby the hopper upon the ratchet-shaft) to move back with the pawl, unless an eyelet happens to have partially passed from the hopper to the chute, in which case the pawl-lever slips, and lets the hopper remain stationary.

I claim, in combination with a reciprocating eyelet-set, or clinching-tool, and with a reciprocating eyelet-chute, an eyelet-box or hopper, which not only moves with the chute, but which also has an intermittent rotative movement, substantially as and for the purpose described.

Also, in combination with a rotating hopper, actuated by a ratchet and pawl, such an arrangement of the ratchet and pawl mechanism as to cause the hopper to have a positive rotative movement in one direction, and a friction or slipping movement in the other direction, substantially as described.

JOS. F. SARGENT.

Witnesses:
J. B. CROSBY,
FRANCIS GOULD.